(12) United States Patent
Dupont de Dinechin et al.

(10) Patent No.: US 11,169,808 B2
(45) Date of Patent: Nov. 9, 2021

(54) BLOCKWISE MATRIX MULTIPLICATION SYSTEM

(71) Applicant: Kalray, Montbonnot Saint Martin (FR)

(72) Inventors: Benoit Dupont de Dinechin, Grenoble (FR); Julien Le Maire, La Tronche (FR); Nicolas Brunie, Grenoble (FR)

(73) Assignee: Kalray, Montbonnot Saint Martin (FR)

( * ) Notice: Subject to any disclaimer, the term of this patent is extended or adjusted under 35 U.S.C. 154(b) by 34 days.

(21) Appl. No.: 16/724,106

(22) Filed: Dec. 20, 2019

(65) Prior Publication Data

US 2020/0201642 A1 Jun. 25, 2020

(30) Foreign Application Priority Data

Dec. 20, 2018 (FR) ..................................... 18 73594

(51) Int. Cl.
*G06F 9/30* (2018.01)
*G06F 9/48* (2006.01)
*G06F 9/54* (2006.01)
*G06F 17/16* (2006.01)

(52) U.S. Cl.
CPC ...... *G06F 9/30145* (2013.01); *G06F 9/30101* (2013.01); *G06F 9/485* (2013.01); *G06F 9/544* (2013.01); *G06F 17/16* (2013.01)

(58) Field of Classification Search
CPC .. G06F 9/30145; G06F 9/30101; G06F 9/485; G06F 9/544; G06F 17/16; G06F 7/523
See application file for complete search history.

(56) References Cited

U.S. PATENT DOCUMENTS

| | | | | |
|---|---|---|---|---|
| 5,396,610 A | * | 3/1995 | Yoshida | G06F 9/30043 711/150 |
| 6,170,001 B1 | * | 1/2001 | Hinds | G06F 9/30036 707/999.006 |
| 2009/0138534 A1 | * | 5/2009 | Lee | G06F 7/762 708/209 |
| 2010/0042779 A1 | * | 2/2010 | Espasa | G06F 9/30043 711/105 |

(Continued)

OTHER PUBLICATIONS

Li, Jiajia, et al., An Optimized Large-Scale Hybrid DGEMM Design for CPUs and ATI GPUs, ICS '12, Jun. 25-29, 2012, 10 pages, 978-1-4503-1316-2/12/06, ACM, San Servolo Island, Venice, Italy.

(Continued)

*Primary Examiner* — Farley Abad (57) ABSTRACT

The disclosure relates to a processor including an N-bit data bus configured to access a memory; a central processing unit CPU connected to the data bus; a coprocessor coupled to the CPU, including a register file with N-bit registers; an instruction processing unit in the CPU, configured to, in response to a load-scatter machine instruction received by the CPU, read accessing a memory address and delegating to the coprocessor the processing of the corresponding N-bit word presented on the data bus; and a register control unit in the coprocessor, configured by the CPU in response to the load-scatter instruction, to divide the word presented on the data bus into K segments and writing the K segments at the same position in K respective registers, the position and the registers being designated by the load-scatter instruction.

8 Claims, 5 Drawing Sheets

(56) References Cited

U.S. PATENT DOCUMENTS

| | | | |
|---|---|---|---|
| 2010/0293342 A1* | 11/2010 | Morfey | G06F 9/30043 |
| | | | 711/154 |
| 2014/0108769 A1* | 4/2014 | Jha | G06F 9/30098 |
| | | | 712/205 |
| 2016/0092234 A1* | 3/2016 | Vasudevan | G06F 9/30174 |
| | | | 712/7 |
| 2018/0004708 A1* | 1/2018 | Muralimanohar | G06G 7/16 |

OTHER PUBLICATIONS

Hehn, Andreas, High Throughput With GPUS, Nov. 19, 2018, 42 pages, NVIDIA.
Lee, Minseok, Turing Architecture and CUDA 10 New Features, AI Conference, Nov. 7-8, 2018, 38 pages, NVIDIA, Seoul.

* cited by examiner

BLOCKWISE MATRIX MULTIPLICATION SYSTEM

CROSS-REFERENCE TO RELATED APPLICATION

This application is based on and claims priority under 35 U.S.C. 119 to French Patent Application No. 18 73594 filed on Dec. 20, 2018, in the National Institute of Industrial Property, the disclosure of which is herein incorporated by reference in its entirety.

FIELD

The disclosure relates to the multiplication of matrices of digital numbers, in particular to processors assisted by specialized hardware accelerators for matrix operations.

BACKGROUND

Artificial intelligence technologies, especially deep learning, are particularly demanding in terms of the multiplication of large matrices, which can have several hundred rows and columns. Hardware accelerators specialized in the multiplication of mixed precision matrices are thus emerging.

The multiplication of large matrices is generally carried out in blocks, i.e. by decomposing the matrices into submatrices of a size adapted to the calculation resources. The accelerators are thus designed to efficiently calculate the products of these submatrices.

For example, NVIDIA® offers in its Volta graphics processor hardware operators called tensor cores, which each monopolize the resources of several graphics cores of the processor to perform in parallel many calculations involved in the multiplication of submatrices. NVIDIA® also offers in its integrated XAVIER™ processor an NVDLA ("NVIDIA® Deep Learning Accelerator") unit with tensor cores independent of graphics cores, and specialized in accelerating neural inference Such an accelerator is said to be "weakly coupled" in that it receives tasks to be performed in batches prepared by a host processor, and then manages the tasks independently of the host processor, including access to a shared memory to read the matrix data. The accelerator and host processor thus operate asynchronously, whereby the host processor and accelerator compete for memory access and must synchronize regularly for the host processor to recover task results and communicate new tasks.

SUMMARY

A method for multiplying matrices is generally provided, comprising the steps of: storing a first source matrix in row-major format in a shared memory, whereby consecutive elements of a row of the matrix are stored at consecutive memory addresses; storing a second source matrix in column-major format in the shared memory, whereby consecutive elements of a column of the matrix are stored at consecutive memory addresses; in a single transfer cycle from the shared memory to processor registers through an N-bit memory bus: reading an N-bit word in a source matrix; writing K consecutive segments of the word at a designated position in K respective N-bit registers, K being such that N is divisible by K; performing step c) for K=R different rows of the first source matrix so as to fill R first registers, whereby each of the R first registers contains a different submatrix of R rows of N/R bits organized in R consecutive segments of the register; performing step c) for K=Q different columns of the second source matrix so as to fill Q second registers, whereby each of the Q second registers contains a different submatrix of Q columns of N/Q bits organized in Q consecutive segments of the register; and in response to the execution of a submatrix multiply machine instruction designating as first operand one of the R first registers and as second operand one of the Q second registers, carrying out in parallel, using a dedicated hardware operator, a scalar product of each segment of the first operand register by each segment of the second operand register, the segments of the operand registers being regarded as vectors.

The method may further comprise the steps of receiving in a central processing unit CPU of a processor a load-scatter machine instruction; in response to the load-scatter instruction, delegating step c) to a coprocessor coupled to the CPU, the position of the segments and the registers being designated by the load-scatter instruction; receiving in the CPU a submatrix multiply instruction; and in response to the submatrix multiply instruction, delegating step f) to the coprocessor.

The CPU and the coprocessor may be coupled according to a VLIW architecture, the method comprising a step of simultaneously executing a load-scatter instruction and a submatrix multiply instruction contained in a same instruction packet received by the CPU, whereby the load-scatter instruction prepares a next operand submatrix while the submatrix multiply instruction operates on current operand submatrices.

The hardware operator may be configured to accumulate each scalar product in a respective segment of a destination register designated by the instruction, with the previous content of the respective segment, the method comprising the steps of executing the submatrix multiply instruction R times while designating each time a different pair of operand registers of same rank among the first R registers and the second Q registers, and the same set of destination registers.

The elements of each source matrix may have a configurable precision among 8, 16 and 32 bits.

A processor is also provided, including an N-bit data bus configured to access a memory; a central processing unit CPU connected to the data bus; a coprocessor coupled to the CPU, including a register file with N-bit registers; an instruction processing unit in the CPU, configured to, in response to a load-scatter machine instruction received by the CPU, read accessing a memory address and delegating to the coprocessor the processing of the corresponding N-bit word presented on the data bus; and a register control unit in the coprocessor, configured by the CPU in response to the load-scatter instruction, to divide the word presented on the data bus into K segments and writing the K segments at the same position in K respective registers, the position and the registers being designated by the load-scatter instruction.

The coprocessor may comprise an array of dot-product hardware operators, each operator configured to simultaneously perform the scalar product of two vectors contained in two segments of two respective operand registers, the ranks of the two segments in the operand registers being determined by the position of the operator in the operator array, and the operand registers being designated by a submatrix multiply machine instruction received by the CPU, whereby the operand registers contain respective operand submatrices, and the operator array produces a result submatrix.

The operators may be configured to accumulate the scalar products in respective segments of destination registers designated by the submatrix multiply instruction.

The elements of each operand submatrix may have a configurable precision among 8, 16 and 32 bits.

BRIEF DESCRIPTION OF THE DRAWINGS

Embodiments will be described in the following non-limiting description, in relation to the attached figures, wherein.

DETAILED DESCRIPTION

Hardware accelerators dedicated to matrix multiplication face difficulties in feeding matrix data stored in a shared memory to the accelerator's computing units without causing famine of the computing units or underutilization of these units. For example, the format for storing data in memory may not be suitable for the format used by the calculation units, so that latency and data buffers may be introduced to reorganize the data.

These difficulties are exacerbated when the accelerator is weakly coupled and operates asynchronously with a host processor that orchestrates the accelerator's tasks. Indeed, the host processor and the accelerator, each operating independently, may conflict with each other when accessing shared memory. In addition, a synchronization mechanism between the host processor and the accelerator may cause the one or the other to stop while waiting for a synchronization state to occur.

An additional difficulty arises when the matrix elements have a configurable precision among several possibilities.

To alleviate these difficulties, a processor architecture is disclosed herein, integrating a strongly coupled coprocessor with its own register file, and a special mechanism for transferring data between the memory and the coprocessor registers.

Figure 1:
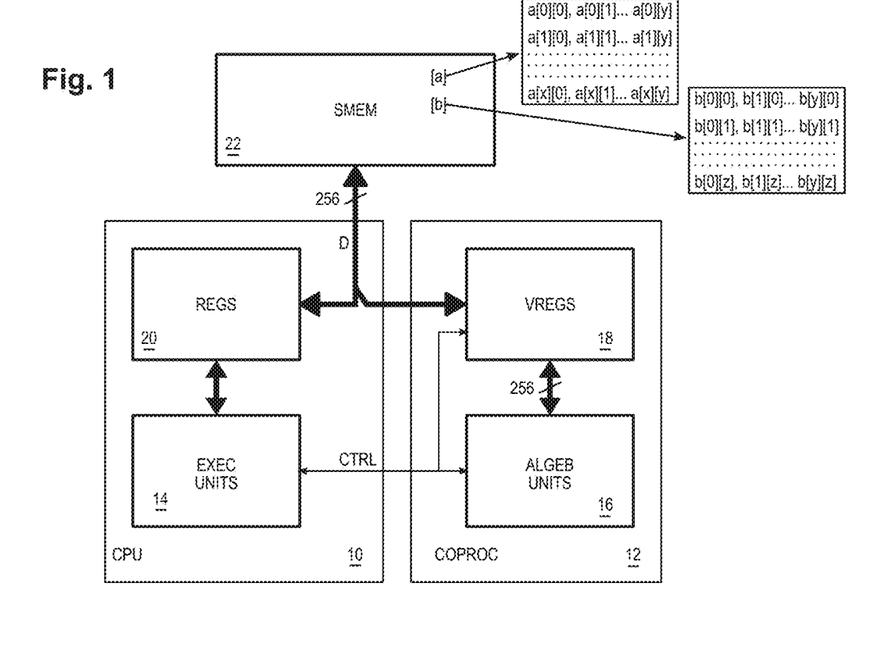
FIG. 1 illustrates a block diagram of a processor integrating a coprocessor strongly coupled to a central processing unit.

FIG. 1 illustrates a block diagram of such a processor architecture. It includes a generic central processing unit (CPU) 10 strongly coupled to a coprocessor 12 integrating hardware operators dedicated to the calculation of matrix products. By "strong coupling" it is understood that the coprocessor obeys cycle by cycle machine instructions that are executed in the CPU and implemented by hardware execution units 14.

More specifically, some machine instructions in the processor instruction set incorporate commands dedicated to the coprocessor. When these instructions reach a corresponding execution unit 14 of the CPU, the execution unit configures the coprocessor operation through control lines CTRL. The coprocessor is wired to immediately obey the signals presented on these control lines. In fact, the coprocessor is an extension of the execution units 14 of the CPU, obeying an extension of a set of generic instructions of the processor. Thus, apart from adapting the execution units to the coprocessor control, the CPU 10 may be of a generic type, allowing in particular to execute an operating system or a program compiled from a generic programming language.

Coprocessor 12 includes hardware algebraic computation units 16, including hardware operators dedicated to the calculation of matrix multiplication. The coprocessor also integrates its own set of working registers, or register file 18, independent of a conventional register file 20 of the CPU 10.

Register files 18 and 20 are connected to a shared memory 22 by an N-bit data bus D. Address and memory control buses, obeying conventional CPU execution units, are not shown. The registers 18 of the coprocessor have the same size N as the data bus and are configured to obey commands from an execution unit 14 of the CPU.

Two matrices to be multiplied [a] and [b] are initially stored in shared memory 22. Depending on the programming language used, a matrix is stored by default in row-major format, i.e. elements of a same row are located at consecutive addresses, or in column-major format, i.e. elements of a same column are located at consecutive addresses. The C programming language uses the first format, while Fortran uses the second format. In any case, standard linear algebra libraries (BLAS) used by these programming languages provide transposition parameters to switch a matrix from one format to another as required by the calculations.

For the needs of the present architecture, the two matrices to be multiplied are stored in complementary formats, for example the first matrix [a] is stored in row-major format, while the second matrix [b] is stored in column-major format. The matrix [b] is thus stored in transposed form. FIG. 1 illustrates the memory content for a matrix [a] of x+1 rows and y+1 columns and a matrix [b] of y+1 rows and z+1 columns. The matrix [b], having a number of rows equal to the number of columns of the matrix [a], can be multiplied by the matrix [a].

Coprocessor 12 is designed to multiply, in a fully hardware manner, two submatrices of the source matrices, the first submatrix [A] having a fixed number Q of rows, and the second submatrix [B] having a fixed number of columns that may be assumed for the moment to be equal to Q. The remaining size of the submatrices, hereinafter referred to as depth, may be configured according to the desired precision of the matrix elements. The multiplication of these submatrices therefore produces a result submatrix [C] of Q×Q elements.

The number Q determines the hardware resources used to carry out the multiplication. For artificial intelligence applications, the value Q=4 offers a reasonable compromise and will be used as an example in the following. Indeed, in artificial intelligence calculations, 8- or 16-bit numbers, seldom 32-bit, are used in floating, fractional or integer representation, resulting in operators that are less complex than those used to process the "single precision" and "double precision" floating point numbers conventionally used in generic CPUs, coded on 32 and 64 bits respectively.

In addition, each submatrix to be multiplied is considered to have an overall size of N bits, i.e. the size of the data bus D, which will be assumed to be 256 bits as an example in the following. Thus, in the examples considered below, the submatrices have 4 rows or columns with a depth of 64 bits. This depth is occupied, depending on the applications, by eight bytes, four 16-bit words, two 32-bit words, or one 64-bit word. They may be integers or fixed or floating point numbers.

Given this structure, one objective is to feed the coprocessor with series of submatrices to be multiplied while fully exploiting the memory bus D. In theory, it would only take two read operations to read a quantity of data corresponding to two submatrices. But the organization of the source matrices in memory does not directly allow this, in a general. Indeed, 256 consecutive bits in memory overlap consecutive rows (or columns) of arbitrary depth, and do not contain 4 aligned sub-rows (or sub-columns) that could form a submatrix.

To address this complication, the processor instruction set is extended by a special machine instruction, which is referred to as a "load-scatter" instruction and which has K variants noted load.0 to load.3 for K=4. A load-scatter instruction designates K registers 18 of the coprocessor, noted V0 to V3 for K=4, and the memory address where to read a 256-bit word W. When executing the instruction in CPU 10, while the memory places the word W on the bus, a register control unit of coprocessor 12 is configured to divide the word W into K N/K-bit segments and write these segments respectively in the K designated registers. In other words, the word W is "scattered" in the registers. The position at which the segments are written in the designated registers is determined by the variant of the load-scatter instruction executed.

FIGS. 2A to 2D illustrate the execution of variants of the load-scatter instruction on source matrices [a] and [b] deeper than 256 bits. It is assumed as an example that the matrix elements are 16-bit words.

Figure 2A:
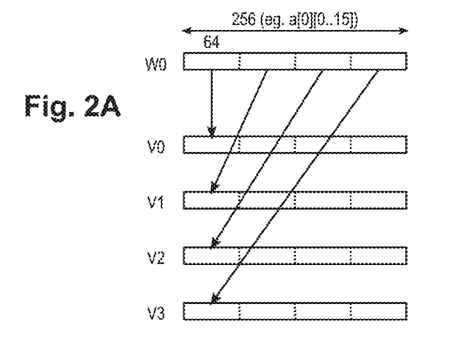
FIGS. 2A to 2D illustrate different steps in filling coprocessor registers from matrix data stored in memory.

In FIG. 2A, a load.0 instruction is executed. The memory address conveyed in the instruction refers, for example, to the first element of the first row of the matrix [a], namely element a[0][0]. The word W0 returned on the bus therefore contains the elements a[0][0] to a[0][15]. The instruction variant configures registers V0 to V3 to receive the respective four segments of the word W0 in their first quarter.

Figure 2B:
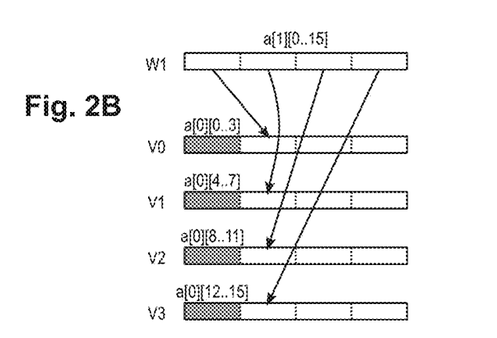

In FIG. 2B, a load.1 instruction is executed. The memory address refers to element a[1][0]. The word W1 returned on the bus therefore contains the elements a[1][0] to a[1][15]. The instruction variant configures registers V0 to V3 to receive the respective four segments of the word W1 in their second quarter.

Figure 2C:
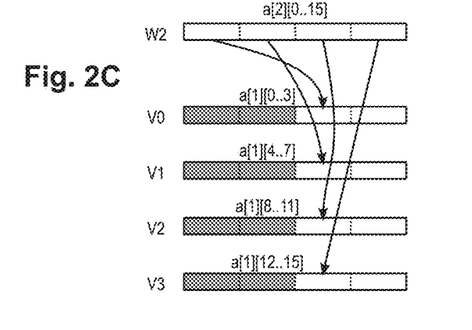

In FIG. 2C, a load.2 instruction is executed. The memory address refers to element a[2][0]. The word W2 returned on the bus therefore contains the elements a[2][0] to a[2][15]. The instruction variant configures registers V0 to V3 to receive the respective four segments of the word W2 in their third quarter.

Figure 2D:
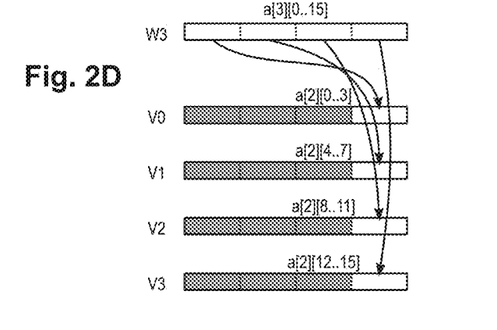

In FIG. 2D, a load.3 instruction is finally executed. The memory address refers to element a[3][0]. The word W3 returned on the bus therefore contains the elements a[3][0] to a[3][15]. The instruction variant configures registers V0 to V3 to receive the respective four segments of the word W3 in their fourth quarter.

At the end of these four load-scatters, each of the registers V0 to V3 contains a consecutive submatrix [A] of 4×4 16-bit words (also noted 4×4×16) along the rows of the source matrix [a]. The rows of each submatrix are contained in four respective segments of the corresponding register V. Registers V0 to V3, containing submatrices [A], will be designated VA0 to VA3.

By proceeding in a similar way for the second matrix [b] with four registers VB0 to VB3, each of these registers receives a consecutive 4×4×16 submatrix [B] along the columns of the source matrix [b]. The columns of each submatrix are contained in four respective segments of the corresponding register VB.

With this procedure, four submatrices [A] and four submatrices [B] that can be multiplied are loaded in the coprocessor's registers in eight consecutive clock cycles. This achieves a transfer rate of one submatrix per cycle, which is optimal because the full bus width is used at each cycle.

The segments of the registers VA and VB, containing rows or columns of submatrices, will be treated in the following as vectors. Thus, a register VAi contains four vectors A[0] to A[3] and a register VBj contains four vectors B[0] to B[3], each vector having four 16-bit components.

Figure 3:
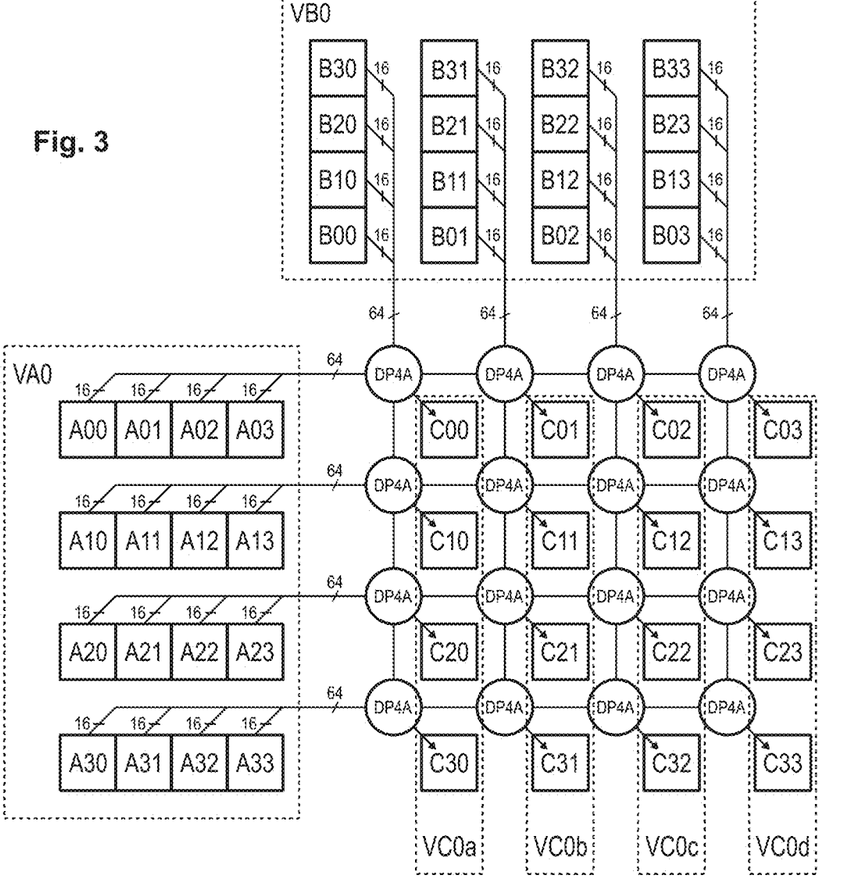
FIG. 3 illustrates a block diagram of an embodiment of a coprocessor hardware calculation unit designed to achieve a multiplication of two submatrices in response to a single machine instruction.

FIG. 3 illustrates a block diagram of an embodiment of a hardware calculation unit 16 of the coprocessor, designed to perform a multiplication of two submatrices [A] and [B] in response to a single dedicated machine instruction that will be noted mm4a. This embodiment corresponds to the example considered in FIGS. 2A to 2B, where the matrix elements have a size of 16 bits.

The calculation unit includes an array of 4×4 hardware dot-product-and-accumulate operators designated DP4A, where the number 4 indicates the dimension of the vectors. A DP4A operator of row i and column j is wired to perform the scalar product of vectors A[i] and B[j] contained respectively in registers VA and VB, and accumulate the scalar product in a cell Cij of a result submatrix [C]. The cell Cij may be all or part of an appropriately sized segment of a register VC of the coprocessor. A convenient size is 64 bits, which involves four registers VCa to VCd to store the result submatrix [C]. The registers VA, VB and VC are designated by an instruction mm4a being executed in the CPU 10, here the registers VA0, VB0 and VC0a-VC0d.

The registers VC are configured to preserve the Q segments organization of the registers VA and VB. In this example, where Q=4 and each result element is encoded on 64 bits, each of the 4 segments of the registers VC contains a single element. As shown as an example, the registers VC are organized so that the four segments of a same register store elements from different rows.

Once the calculations on the result submatrix have been completed, in this particular case of segments containing a single element, the contents of the four registers VC may be transferred to memory in four cycles at addresses corresponding to the positions of the columns of the submatrix [C] in the complete result matrix [c], thus contributing to a result matrix [c] stored in column-major format.

The registers VC could also be organized in a complementary manner, so that the four segments of a same register store different column elements. In this case, the contents of the four registers VC may be transferred to memory in four cycles corresponding to the positions of the rows of the submatrix [C] in the complete result matrix [c], thus contributing to a result matrix [c] stored in row-major format.

Preferably, the processor instruction set is extended by a machine instruction for transposing a tuple containing Q registers. In the case where Q=4, this instruction designated mt4 takes the contents of four registers designated VCa, VCb, VCc, VCd and fills four other registers designated VDa, VDb, VDc, VDd, such that:

VDa receives in its segments respectively the first segments of VCa, VCb, VCc and VCd.

VDb receives in its segments respectively the second segments of VCa, VCb, VCc and VCd.

VDc receives in its segments respectively the third segments of VCa, VCb, VCc and VCd.

VDd receives in its segments respectively the fourth segments of VCa, VCb, VCc and VCd.

Following the execution of this instruction, each of the registers VCa, VCb, VCc, VCd can be stored in memory to contribute to a row of the result matrix [c] stored in row-major format.

Figure 4:
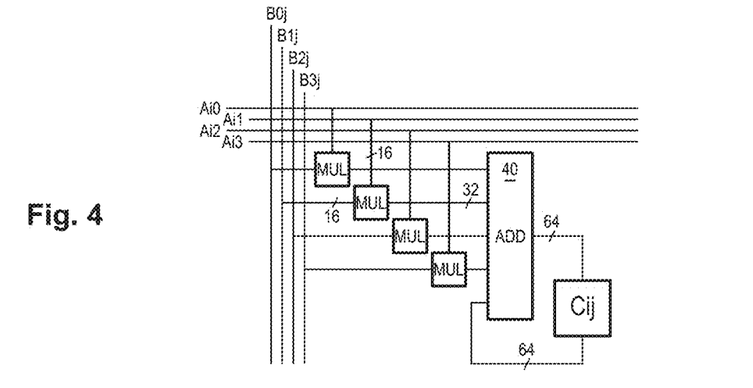
FIG. 4 illustrates a block diagram of a dot-product operator used in the calculation unit of FIG. 3.

FIG. 4 illustrates a block diagram of a dot-product operator DP4A at position (i, j) in the operator array. The operator processes vectors A[i] and B[j]. More specifically, the operator includes four 16-bit multipliers MUL, each receiving a respective component (Ai0 to Ai3) of vector A[i] as the first multiplicand, and the corresponding component (B0j to B3j) of vector B[j] as the second multiplicand. The four products, encoded on 32 bits, are provided to a multi-adder 40 connected to accumulate the sum of the products in a 64-bit register segment Cij. By "accumulate" it is meant that the segment Cij receives the sum of the products and of the previous content of the segment Cij. The multi-adder 40 is thus wired to add four 32-bit numbers and one 64-bit number.

In theory, the calculation unit of FIG. 3, in the form of wired combinatorial logic, instantly produces the result matrix [C] in response to an instruction mm4a that designates the registers VA, VB and VC to be used. In practice, such a calculation unit, taking into account the propagation delays of combinatorial logic, will take more than one processor clock cycle to establish the result. Thus the calculation unit, in particular each operator DP4A, is generally designed in a pipeline structure, meaning that the calculation is broken down into several steps synchronized over successive clock cycles, but that a new calculation can be initiated, i.e. a new instruction mm4a executed at each clock cycle.

Thus, a pipeline structure is not optimal for performing isolated calculations. However, by properly organizing successive calculations to keep the pipeline permanently supplied, the pipeline structure may be 100% efficient after an initial pipeline initiation phase and before a final pipeline emptying phase.

The fact that eight submatrices are pre-loaded into the coprocessor registers using the load-scatter instructions (FIGS. 2A-2D), and that the submatrices to be multiplied are thus available in the registers according to an organization immediately usable by the calculation unit, makes it possible to maintain the pipeline supplied at least for the calculation of four submatrix products. These four submatrix products, which can be performed by executing four consecutive mm4a instructions designating the same destination registers VC, provide a 4×4 result matrix [C] which is the product of a 4×16 source submatrix by a 16×4 source submatrix.

In addition, the highly coupled configuration between the coprocessor and the CPU allows the processor to be organized in a VLIW ("Very Large Instruction Word") architecture. Then, a load-scatter instruction and an mm4a instruction can be executed in the same VLIW packet, whereby these two instructions are executed in parallel, which occupies the memory bus to retrieve the next submatrices while the calculations are performed on the current submatrices.

Table 1 below presents a sequence of instructions that achieves the multiplication of an 8×32 matrix [a] by a 32×8 matrix [b] providing an 8×8 matrix [c] without dead time and exploiting all the bandwidth of the memory bus and the computing unit in parallel. Instructions placed on a same line correspond to instructions executed in a same VLIW packet. For reasons of compactness of notation and clarity, the coprocessor registers are designated by Ax and By for the multiplicand submatrices and Cz for the result submatrix, bearing in mind that all these registers, chosen from register file 18, are of same nature.

The first parameter of the instructions identifies the destination registers. The subsequent parameters of the instructions normally identify a memory address or operand registers—an explanatory notation has been used here that details what the destination registers receive. It is assumed that all registers C are set to 0 before the operations, or that the operators are configured by a flag of the mm4a instructions to disable accumulation when first writing to a register C, which is illustrated by the sign "=" (direct write) instead of the sign "+=" (accumulate).

Phases 0 and 1 correspond to what has been described in relation to FIGS. 2A-2D.

TABLE 1

Phase 0: Load submatrices a[0 . . . 3][0 . . . 3] to a[0 . . . 3][12 . . . 15]

load.0 A0A1A2A3 <- a[0][0 . . . 15]
load.1 A0A1A2A3 <- a[1][0 . . . 15]
load.2 A0A1A2A3 <- a[2][0 . . . 15]
load.3 A0A1A2A3 <- a[3][0 . . . 15]

Phase 1: Load submatrices b[0 . . . 3][0 . . . 3] to b[12 . . . 15][0 . . . 3]

load.0 B0B1B2B3 <- b[0 . . . 15][0]
load.1 B0B1B2B3 <- b[0 . . . 15][1]
load.2 B0B1B2B3 <- b[0 . . . 15][2]
load.3 B0B1B2B3 <- b[0 . . . 15][3]

Phase 2: Load submatrices a[4 . . . 7][0 . . . 3] to a[4 . . . 7][12 . . . 15] and calculate c[0 . . . 3][0 . . . 3]

load.0 A4A5A6A7 <- a[4][0 . . . 15]; mm4a C0C1C2C3 = A0 * B0
load.1 A4A5A6A7 <- a[5][0 . . . 15]; mm4a C0C1C2C3 += A1 * B1
load.2 A4A5A6A7 <- a[6][0 . . . 15]; mm4a C0C1C2C3 += A2 * B2
load.3 A4A5A6A7 <- a[7][0 . . . 15]; mm4a C0C1C2C3 += A3 * B3

Phase 3: Load submatrices b[0 . . . 3][4 . . . 7] to b[12 . . . 15][4 . . . 7] and calculate c[4 . . . 7][0 . . . 3]

load.0 B4B5B6B7 <- b[0 . . . 15][4]; mm4a C4C5C6C7 = A4 * B0
load.1 B4B5B6B7 <- b[0 . . . 15][5]; mm4a C4C5C6C7 += A5 * B1
load.2 B4B5B6B7 <- b[0 . . . 15][6]; mm4a C4C5C6C7 += A6 * B2
load.3 B4B5B6B7 <- b[0 . . . 15][7]; mm4a C4C5C6C7 += A7 * B3

TABLE 1-continued

Phase 4: Load submatrices a[0 . . . 3][16 . . . 19] to a[0 . . . 3][28 . . . 31] and calculate c[0 . . . 3][4 . . . 7]

load.0 A8A9A10A11 <- a[0][16 . . . 31]; mm4a C8C9C10C11 = A0 * B4
load.1 A8A9A10A11 <- a[1][16 . . . 31]; mm4a C8C9C10C11 += A1 * B5
load.2 A8A9A10A11 <- a[2][16 . . . 31]; mm4a C8C9C10C11 += A2 * B6
load.3 A8A9A10A11 <- a[3][16 . . . 31]; mm4a C8C9C10C11 += A3 * B7
Phase 5: Load submatrices b[16 . . . 19][0 . . . 3] to b[28 . . . 31][0 . . . 3] and calculate c[4 . . . 7][4 . . . 7]

load.0 B8B9B10B11 <- b[16 . . . 31][0]; mm4a C12C13C14C15 = A4 * B4
load.1 B8B9B10B11 <- b[16 . . . 31][1]; mm4a C12C13C14C15 += A5 * B5
load.2 B8B9B10B11 <- b[16 . . . 31][2]; mm4a C12C13C14C15 += A6 * B6
load.3 B8B9B10B11 <- b[16 . . . 31][3]; mm4a C12C13C14C15 += A7 * B7
Phase 6: Load the submatrices a[4 . . . 7][16 . . . 19] to a[4 . . . 7][28 . . . 31] and complete c[0 . . . 3][0 . . . 3].

load.0 A12A13A14A15 <- a[4][16 . . . 31]; mm4a C0C1C2C3 += A8 * B8
load.1 A12A13A14A15 <- a[5][16 . . . 31]; mm4a C0C1C2C3 += A9 * B9
load.2 A12A13A14A15 <- a[6][16 . . . 31]; mm4a C0C1C2C3 += A10 * B10
load.3 A12A13A14A15 <- a[7][16 . . . 31]; mm4a C0C1C2C3 += A11 * B11
Phase 7: Load submatrices b[16 . . . 19][4 . . . 7] to b[28 . . . 31][4 . . . 7] and complete c[4 . . . 7][0 . . . 3].

load.0 B12B13B14B15 <- b[16 . . . 31][4]; mm4a C4C5C6C7 += A12 * B8
load.1 B12B13B14B15 <- b[16 . . . 31][5]; mm4a C4C5C6C7 += A13 * B9
load.2 B12B13B14B15 <- b[16 . . . 31][6]; mm4a C4C5C6C7 += A14 * B10
load.3 B12B13B14B15 <- b[16 . . . 31][7]; mm4a C4C5C6C7 += A15 * B11
Phase 8: complete c[0 . . . 3][4 . . . 7]

;                               mm4a C8C9C10C11 += A8 * B12
;                               mm4a C8C9C10C11 += A9 * B13
;                               mm4a C8C9C10C11 += A10 * B14
;                               mm4a C8C9C10C11 += A11 * B15
Phase 9: complete c[4 . . . 7][4 . . . 7]

;                               mm4a C12C13C14C15 += A12*B12
;                               mm4a C12C13C14C15 += A13*B13
;                               mm4a C12C13C14C15 += A14*B14
;                               mm4a C12C13C14C15 += A15*B15

After phase 9 and some cycles necessary to empty the pipeline of the calculation unit, registers C0 to C15 contain the matrix resulting from the multiplication, an 8×8×64 matrix.

It should be noted that phases 6 to 9 reuse the C registers of phases 2 to 5, namely the same result submatrices c[0 . . . 3][0 . . . 3], c[0 . . . 3][4 . . . 7], c[4 . . . 7][0 . . . 3] and c[4 . . . 7][4 . . . 7]. Indeed, during phases 2 to 5, the submatrices c[ ][ ] are calculated only on the first half of the depth of the source matrices (elements 0 to 15). In phases 6 to 9 the submatrices c[ ][ ] are updated with the influence of the second half of the depth of the source matrices (elements 16 to 31). This calculation naturally extends to any depth by updating the c[ ][ ] submatrices with the influence of the following 256-bit slices in the depth of the matrices [a] and [b].

The source matrices mentioned as examples have a depth of a multiple of the width N of the memory bus. When this property is not applicable, load-scatter operations affecting the last part of the rows (or columns) read words whose first part contains the end of the row (or column), and the second part contains unusable data (either the beginning of a misaligned row or column, or arbitrary data after the end of the matrix). In this case, the data in the second part of the words are replaced by zeros, and the words thus readjusted are processed normally as described above.

As previously mentioned, the depth of the matrices varies according to the precision chosen for the elements. In the above, matrices of 16-bit elements were considered. The elements may also be 8 or 32 bits long without affecting the organization of the source matrices in memory or their transfer to the coprocessor registers. However, some modifications may be achieved in the coprocessor's calculation unit 16.

Figure 5:
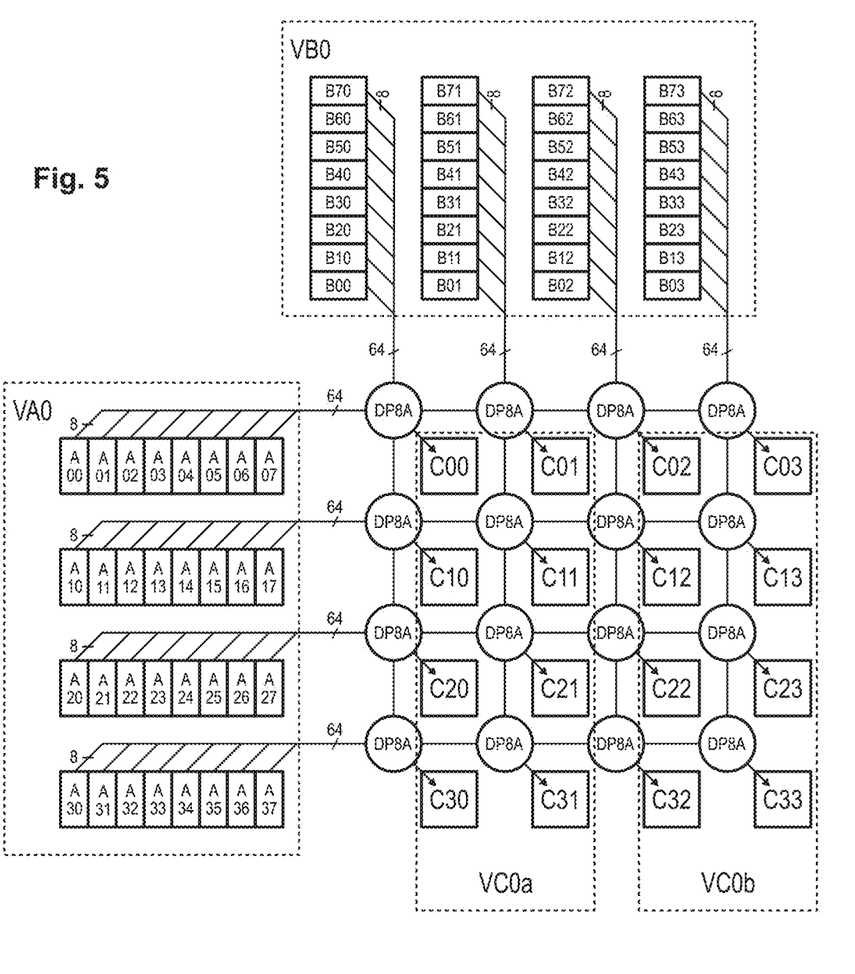
FIG. 5 illustrates a block diagram of another embodiment of a coprocessor hardware calculation unit designed to achieve a multiplication of two submatrices in response to a single machine instruction.

FIG. 5 illustrates a block diagram of an embodiment of a calculation unit 16 of the coprocessor, designed to perform a multiplication of two submatrices [A] and [B] of 8-bit elements in response to a single dedicated machine instruction that will be designated mm8a.

The transfer of the elements of the source matrices from the memory to the coprocessor's registers VA and VB is carried out in the same manner as before, with a series of four load-scatter instructions. As a result, as represented for the operand registers VA0 and VB0, the four segments of the registers now contain vectors of eight 8-bit elements instead of four 16-bit elements.

The dot-product operators, here referred to as DP8A, are then configured to simultaneously calculate eight products and their sum. The precision of the results is 32 bits instead of 64 bits, so only two registers VC0a and VC0b are used to store the result submatrix [C].

As shown by way of example, the registers VC are organized so that each segment stores two row elements of the result submatrix. For example, register VC0a contains in its respective segments, pairs (C00, C01), (C10, C11), (C20, C21) and (C30, C31). In this case, the contents of the two registers VC are not directly transferable to memory in the correct order to form a 4×4 submatrix of the result matrix [c].

With a conventional store instruction, it would take 8 cycles to store the contents of registers VC0a and VC0b to form a result matrix [c] in row-major format, namely four cycles using only a quarter of the bus width to transfer the four segments of register VC0a, and then four cycles using only a quarter of the bus width to transfer the four segments of register VC0b. This results in a bandwidth waste of 75%.

Preferably, the processor instruction set is extended by an instruction complementary to the load-scatter instruction, which will be referred to as a "gather-store" instruction. The execution of this instruction by the CPU configures the coprocessor to concatenate on the memory bus Q segments taken from Q designated registers. The position of the segment in the registers is defined by a corresponding variant of the instruction.

In this example, with Q=4, four gather-store instructions are executed to process four registers VC0a, VC0b, VC1a and VC1b containing two result submatrices. The mechanism is similar to that of FIGS. 2A-2D by reversing the direction of the arrows.

In the first cycle, the word W0 contains the elements C00, C01 of the first segment of register VC0a, followed by the elements C02, C03 of the first segment of register VC0b, followed by the four elements of the first row of the second submatrix stored in the first segments of registers VC1a and VC1b (not shown). The remaining three cycles similarly transfer the second to fourth rows of the two submatrices. In this way, two adjacent submatrices are formed in row-major format in a result matrix stored in row-major format, fully occupying the bus bandwidth.

In relation to FIG. 3, it was indicated that the contents of the registers VC0a to VC0d could be transferred to memory in four cycles using a conventional store instruction to form a result matrix stored in column-major format. Instead, using four gather-store instructions, the submatrix is written to memory in row-major format. In other words, in the particular case where each register VC contains exactly four elements, the submatrix can be transferred to memory by rows or columns depending on the type of store instruction chosen, and this by fully occupying the bus bandwidth.

An alternative to the use of gather-store instructions is to use, in the case where Q=4, the previously described mt4 transposition instruction, which allows in one cycle to fill four registers VD0a, VD0b, VD1a, VD1b from the registers VC0a, VC0b, VC1a, VC1b. The registers VD0a, VD0b, VD1a, VD1b can then be written in a conventional way in a result matrix stored in row-major format by fully occupying the bus bandwidth.

Figure 6:
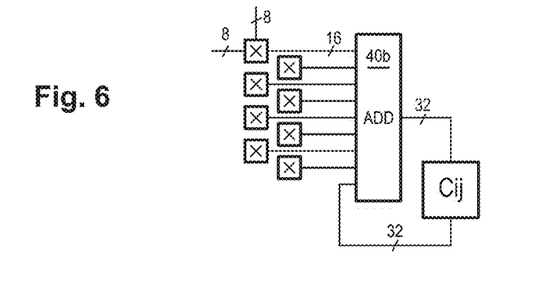
FIG. 6 illustrates a block diagram of a dot-product operator used in the calculation unit of FIG. 5.

FIG. 6 illustrates a block diagram of a dot-product operator DP8A at a position (i, j) in the operator array. It includes eight 8-bit multipliers each receiving a respective component (Ai0 to Ai7) of vector A[i] as the first multiplicand, and the corresponding component (B0j to B7j) of vector B [j] as the second multiplicand. The eight products, encoded on 16 bits, are provided to a multi-adder 40b connected to accumulate the sum of the products in a 32-bit register segment Cij.

Similarly, when the matrix elements are 32-bit words, the transfer from memory to the coprocessor registers is again performed in the same manner, with a series of four load-scatter instructions. The register segments then contain vectors of two 32-bit elements. The dot-product operators are then designated DP2A and they accumulate products of two 32-bit numbers in a 64 or 128-bit register segment. The matrix multiply instruction is then designated mm2a.

Figure 7:
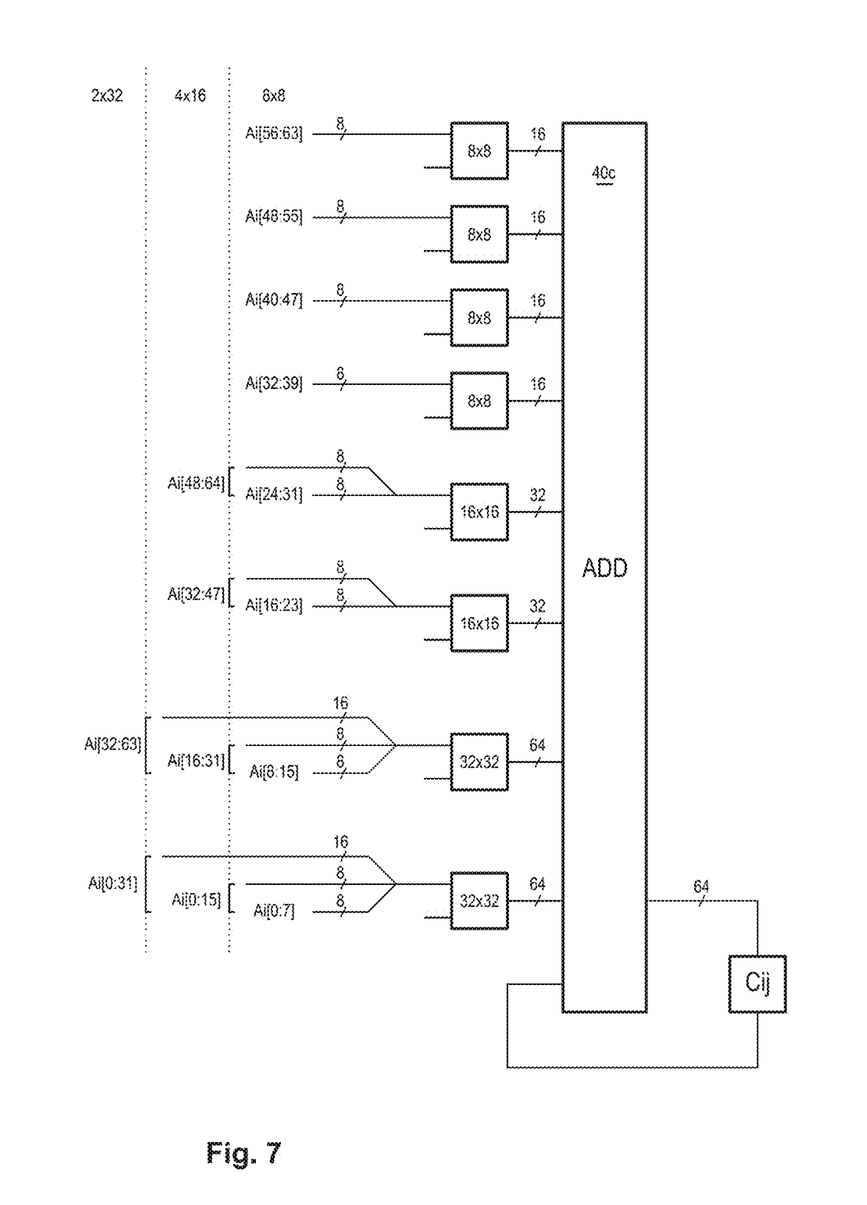
FIG. 7 illustrates a block diagram of a configurable dot-product operator embodiment.

FIG. 7 illustrates a block diagram of a configurable dot-product operator embodiment for processing matrix elements having a precision adjustable among 8, 16 and 32 bits. It includes two 32-bit number multipliers, two 16-bit number multipliers and four 8-bit number multipliers, the outputs of which are provided to a multi-adder 40c, connected to accumulate the sum of the products in a 64 or 128-bit register segment Cij.

Only the connections related to a first operand vector Ai are shown. The used bits of the corresponding register segment are indicated in square brackets.

The 32×32 multipliers are connected to process the first two components of the vectors, regardless of their precision. Each of the two components of a 2×32-bit vector is applied to all input lines of a respective one of the 32×32 multipliers. The other multipliers produce a zero result.

The 16×16 multipliers are connected to process the third and fourth components of 4×16 or 8×8-bit vectors. For a 4×16-bit vector, each of the first two components is applied to the first 16 input lines of a respective one of the two 32×32 multipliers, and each of the next two components is applied to all input lines of a respective one of the two 16×16 multipliers.

For an 8×8 bit vector, the first four components are applied respectively to the first 8 input lines of the two 32×32 multipliers and the two 16×16 multipliers, and the remaining components are applied respectively to all input lines of the 8×8 multipliers.

The organization of the interconnection between the inputs of the multipliers and the registers is determined by the nature of the matrix multiplication instruction executed, namely mm2a, mm4a or mm8a.

As previously indicated, matrix elements may be integer or floating-point numbers (in the latter case, 16-bit and 32-bit precisions are preferably used). The multipliers and adders are configured accordingly. If it is desired to process both integer and floating-point numbers, the multipliers will have a reconfigurable structure based on a floating-point multiplication structure.

When the matrix elements have a 32-bit precision, it has been proposed that the precision of the results could be 64 bits or 128 bits. A precision of 64 bits may be sufficient if a certain level of error is accepted, such as saturation when processing integers, or rounding errors when processing fixed or floating point numbers.

In the examples presented, it was considered that both source matrices to be multiplied had elements of same precision. The disclosed architecture can also multiply mixed precision matrices. For example, in the case of a multiplication of a matrix [a] of 16-bit elements by a matrix [b] of 8-bit elements, the following operations may be provided.

Four registers A0-A3 are filled by a first set of four load-scatter instructions to contain four 4×4×16 submatrices taken from the first four rows of the source matrix [a]. In other words, these submatrices contain rows a[0][0 . . . 15] to a[3][0 . . . 15].

Four other registers A4-A7 are filled by a second set of four load-scatter instructions to contain four 4×4×16 submatrices taken from the next four rows of the matrix [a]. In other words, these submatrices contain rows a[4][0 . . . 15] to a[7][0 . . . 15].

Four registers B0-B3 are filled by a third set of four load-scatter instructions to contain eight 4×4×8 submatrices taken from the first four columns of the matrix [b]. In other words, these submatrices contain columns b[0 . . . 31][0] to b[0 . . . 31][3].

The two halves of register B0 contain two submatrices, one of which b[0 . . . 3][0 . . . 3] can be multiplied with the submatrix a[0 . . . 3][0 . . . 3] of register A0 to contribute to the result submatrix c[0 . . . 3][0 . . . 3]. The other submatrix b[4 . . . 7][0 . . . 3] of register B0 can be multiplied with the submatrix a[4 . . . 7][0 . . . 3] of register A4 to contribute to the result submatrix c[4 . . . 7][0 . . . 3]. In other words, the multiplication of the two halves of register B0 is organized to contribute to two different submatrices of the result matrix [c].

The two halves of register B1 contain two submatrices that can be multiplied respectively with the submatrices of registers A1 and A5 to contribute respectively to the same result submatrices c[0 . . . 3][0 . . . 3] and c[4 . . . 7][0 . . . 3].

Similarly, the two halves of register B2 contain respectively two submatrices to be multiplied with the submatrices of registers A2 and A6, and the two halves of register B3 contain respectively two submatrices to be multiplied with the submatrices of registers A3 and A7, each time to contribute to the same result submatrices c[0 . . . 3][0 . . . 3] and c[4 . . . 7][0 . . . 3], i.e. without changing the registers VC during these operations.

To multiply the contents of the registers, two variants of the multiplication operation mm4a can be used in two consecutive cycles designating two different registers A (e. g. A0 and A4), one corresponding register B (e. g. B0), and two sets of two registers C to contain the result. With reference to the 4×4×16 submatrix multiplication unit in FIG. 3, both variants first configure the DP4A operators to use only the 8 least significant bits of the multiplier's B inputs (referred to as half-inputs). The first variant additionally reconfigures the operators to connect the sixteen 8-bit half-inputs to the first four bytes contained in each of the segments Bi0 to Bi3 of register B0. The second variant instead reconfigures the operators to connect the sixteen 8-bit half inputs to the last four bytes contained in each of the segments Bi0 to Bi3 of register B0.

In mixed precision matrix multiplication applications, it is conceivable that the two multiplicand matrices are of same size in number of bits, and therefore that the lower precision matrix is larger in number of elements than the higher precision matrix. A multiplicand matrix of 8-bit elements could thus have twice as many rows or columns as the corresponding multiplicand matrix of 16-bit elements. In this case, a calculation unit can be designed to multiply Q×Q×16 submatrices by Q×(2Q)×8 submatrices, or conversely (2Q)×Q×8 matrices.

Figure 8:
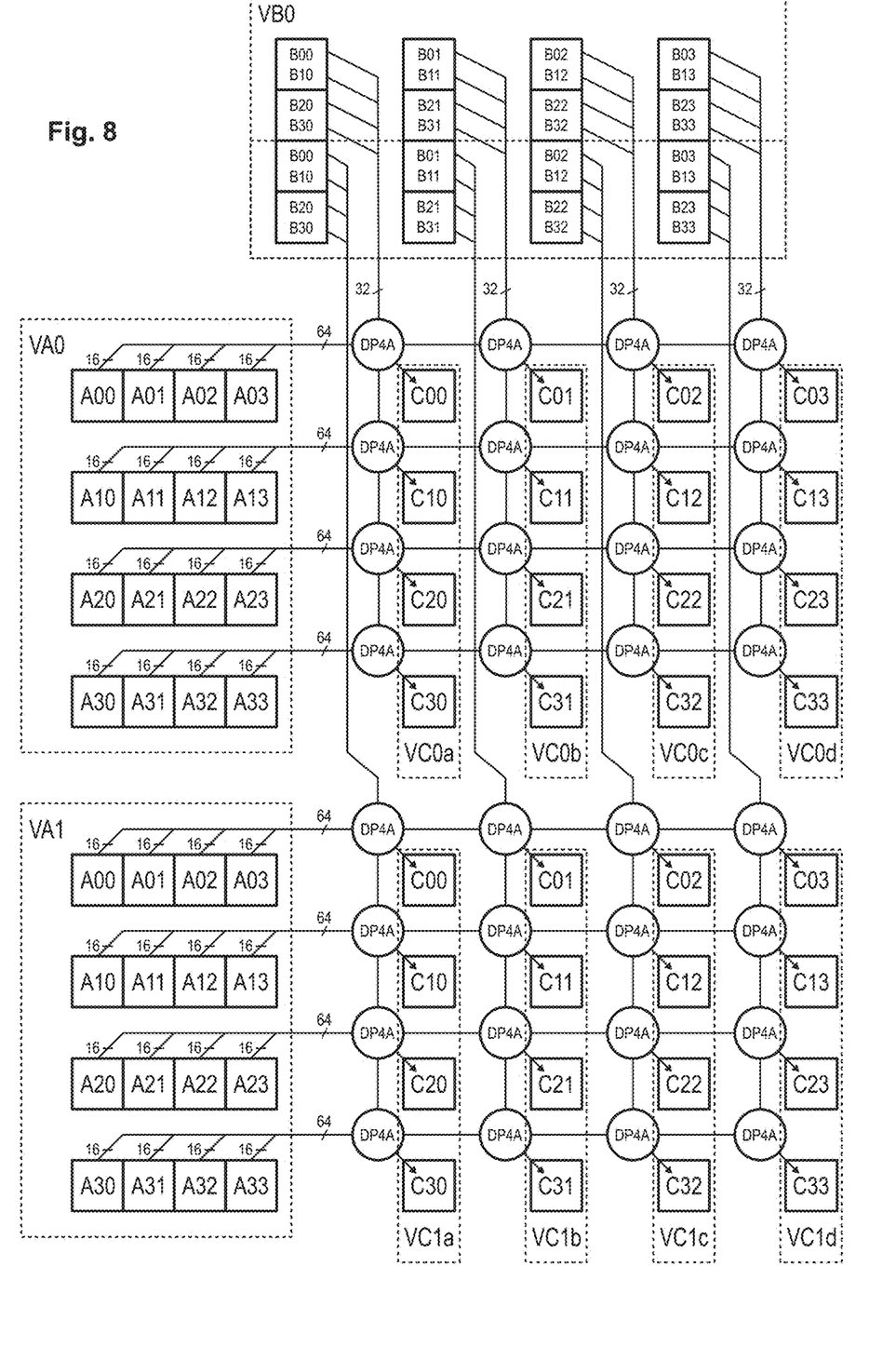
FIG. 8 illustrates a block diagram of an embodiment of a coprocessor hardware calculation unit designed to achieve a multiplication of submatrices of different sizes in response to a single machine instruction.

FIG. 8 illustrates an example of a corresponding calculation unit for Q=4, derived from the calculation unit of FIG. 3, configured to respond to a simultaneous execution of the two previously indicated variants of the mm4a instruction by producing two result 4×4 submatrices in two sets of registers VC from two 4×4×16 submatrices in registers VA0 and VA1 and a 4×8×8 submatrix in register VB0. Register VB0 is considered to be subdivided into two halves, each with 4 segments each containing a four-byte vector, and the DP4A dot-product operators are organized into two 4×4 arrays that simultaneously process the two respective halves of register VB0.

In a more general case, a calculation unit can be provided comprising dot-product operators organized in an R×Q array with R>Q. In this case, the load-scatter instructions are configured to fill R different registers A in a first series of R cycles, and Q different registers B in a second series of Q cycles. Each register A then contains a submatrix of Q rows with elements of size N/Q bits, and each register B contains R/Q submatrices of Q columns with elements of size N/R bits, where N is the width of the memory bus and the size of the registers, and is divisible by Q and R. Each multiplication instruction reads the contents of R/Q registers A and one register B, to produce a submatrix with dimensions R×Q.

For the submatrices of a register A and a register B to be multipliable, their vectors should have the same size. The value N being preferably a constant equal to the size of the memory bus, this implies that the two submatrices have different precision elements if Q R. In practice Q and R may vary by a ratio 1, 2 or 4 according to the combinations of precisions chosen for the matrices among 8, 16 and 32 bits.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for multiplying matrices, the method comprising the following steps:
   a) storing a first source matrix in row-major format in a shared memory, whereby consecutive elements of a row of the first source matrix are stored at consecutive memory addresses;
   b) storing a second source matrix in column-major format in the shared memory, whereby consecutive elements of a column of the second source matrix are stored at consecutive memory addresses;
   c) in a single transfer cycle from the shared memory to N-bit registers through an N-bit memory bus:
      reading an N-bit word in one of the first and second source matrices, and
      writing K consecutive segments of the N-bit word at a designated position in K respective N-bit registers, K being such that N is divisible by K;
   d) performing step c) for K=R different rows of the first source matrix so as to fill R first N-bit registers, whereby each of the R first N-bit registers contains a different submatrix of R rows of N/R bits organized in R consecutive segments of the register;
   e) performing step c) for K=Q different columns of the second source matrix so as to fill Q second N-bit registers, whereby each of the Q second registers contains a different submatrix of Q columns of N/Q bits organized in Q consecutive segments of the register; and
   f) in response to execution of a submatrix multiply machine instruction designating as first operand register one of the R first registers and as second operand register one of the Q second registers, carrying out in parallel, using a dedicated hardware operator, a scalar product of each segment of the first operand register by each segment of the second operand register, the segments of the operand registers being regarded as vectors.

2. The method according to claim 1, comprising the following steps:
   receiving in a central processing unit (CPU) of a processor a load-scatter machine instruction;
   in response to the load-scatter instruction, delegating step c) to a coprocessor coupled to the CPU, the designated position of the K consecutive segments and the N-bit registers being designated by the load-scatter instruction;

receiving in the CPU a submatrix multiply machine instruction; and in response to the submatrix multiply instruction, delegating step f) to the coprocessor.

3. The method according to claim 2, wherein the CPU and the coprocessor are coupled according to a very large instruction word (VLIW) architecture, the method comprising a step of simultaneously executing a load-scatter instruction and a submatrix multiply instruction contained in a same instruction packet received by the CPU, whereby the load-scatter instruction prepares a next operand submatrix while the submatrix multiply instruction operates on current operand submatrices.

4. The method according to claim 1, wherein the hardware operator is configured to accumulate each scalar product in a respective segment of a destination register designated by the submatrix multiply machine instruction, with previous content of the respective segment, the method comprising the following steps:

executing the submatrix multiply machine instruction R times while designating each time a different pair of operand registers of same rank among the first R registers and the second Q registers, and the same set of destination registers.

5. The method according to claim 1, wherein the elements of each source matrix have a configurable precision among 8, 16 and 32 bits.

6. A processor comprising:

an N-bit data bus configured to access a memory;

a central processing unit (CPU) connected to the N-bit data bus;

a coprocessor coupled to the CPU, including a register file with N-bit registers;

an instruction processing unit in the CPU, configured to, in response to a load-scatter machine instruction received by the CPU, read accessing a memory address and delegating to the coprocessor the processing of a corresponding N-bit word presented on the data bus;

a register control unit in the coprocessor, configured by the CPU in response to the load-scatter instruction, to divide the N-bit word presented on the data bus into K segments and writing the K segments at the same position in K respective N-bit registers, the position and the registers being designated by the load-scatter machine instruction; and in the coprocessor, an array of dot-product hardware operators, each dot-product hardware operator configured to simultaneously perform a scalar product of two vectors contained in two segments of two respective operand registers, ranks of the two segments in the two respective operand registers being determined by the position of the dot-product hardware operator in the dot-product hardware operator array, and the operand registers being designated by a submatrix multiply machine instruction received by the CPU, whereby the operand registers contain respective operand submatrices, and the dot-product hardware operator array produces a result submatrix.

7. The processor according to claim 6, wherein the operators are configured to accumulate the scalar products in respective segments of destination registers designated by the submatrix multiply machine instruction.

8. The processor according to claim 6, wherein elements of each operand submatrix have a configurable precision among 8, 16 and 32 bits.

* * * * *